United States Patent
Yang

(10) Patent No.: US 10,659,938 B2
(45) Date of Patent: May 19, 2020

(54) REGISTRATION METHOD AND COMMUNICATION METHOD FOR APPLICATION DEDICATED NODE (ADN), AND NODES

(71) Applicant: ZTE CORPORATION, Shenzhen, Guangdong Province (CN)

(72) Inventor: Kun Yang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/521,249

(22) PCT Filed: Jul. 7, 2015

(86) PCT No.: PCT/CN2015/083464
§ 371 (c)(1),
(2) Date: Apr. 21, 2017

(87) PCT Pub. No.: WO2016/062119
PCT Pub. Date: Apr. 28, 2016

(65) Prior Publication Data
US 2017/0311114 A1    Oct. 26, 2017

(30) Foreign Application Priority Data
Oct. 24, 2014   (CN) .......................... 2014 1 0579663

(51) Int. Cl.
*H04W 4/70* (2018.01)
*H04W 76/10* (2018.01)
*H04W 60/00* (2009.01)

(52) U.S. Cl.
CPC ............. *H04W 4/70* (2018.02); *H04W 60/00* (2013.01); *H04W 76/10* (2018.02)

(58) Field of Classification Search
CPC ....... H04W 4/70; H04W 76/10; H04W 60/00; H04L 5/0092; H04L 1/0046; H04L 1/0053; H04L 1/0072
See application file for complete search history.

(56) References Cited

U.S. PATENT DOCUMENTS

2013/0336222 A1* 12/2013 Lu ........................... H04W 4/70
                                                              370/328
2014/0256285 A1   9/2014 Koo
(Continued)

FOREIGN PATENT DOCUMENTS

CN   103618800   3/2014
CN   104093118   10/2014

OTHER PUBLICATIONS

English translation of CN 104093118 provided by Applicant (Year: 2014).*

(Continued)

*Primary Examiner* — Ian N Moore
*Assistant Examiner* — Latresa A McCallum
(74) *Attorney, Agent, or Firm* — Ferguson Case Orr Paterson LLP

(57) ABSTRACT

The present disclosure provides a registration method and communication method for an Application Dedicated Node (ADN), and nodes, and relates to the field of Machine Type Communication (MTC). A Common Service Entity of a Middle Node (MN-CSE) creates an application dedicated resource for an Application Entity of the ADN (ADN-AE), and announces the application dedicated resource to a CSE of an Infrastructure Node (IN-CSE). The IN-CSE creates an announcement resource corresponding to the application dedicated resource. The IN-CSE determines the application dedicated resource corresponding to the announcement resource according to the ADN-AE which an IN-AE requests to operate, and establishes a connection with the (Continued)

MN-CSE. The MN-CSE establishes a connection with the ADN-AE through the application dedicated resource.

11 Claims, 3 Drawing Sheets

(56) References Cited

U.S. PATENT DOCUMENTS

| | | | |
|---|---|---|---|
| 2015/0358874 A1* | 12/2015 | Ahn | H04L 12/66 370/331 |
| 2016/0088420 A1* | 3/2016 | Kim | H04W 4/70 370/328 |
| 2016/0212732 A1* | 7/2016 | Choi | H04W 4/70 |
| 2016/0302069 A1* | 10/2016 | Kim | H04L 9/32 |
| 2016/0302085 A1* | 10/2016 | Park | H04L 67/303 |

OTHER PUBLICATIONS

International Search Report, International Application No. PCT/CN2015/083464, dated Sep. 21, 2015.
European Search Report for Application No. EP 15852632.7; dated Feb. 20, 2018.
"oneM2M Functional Architecture Baseline Draft, oneM2M-Ts-0001-V-1.2," XP084008293.

* cited by examiner

REGISTRATION METHOD AND COMMUNICATION METHOD FOR APPLICATION DEDICATED NODE (ADN), AND NODES

TECHNICAL FIELD

The present disclosure relates to the field of Machine-Type Communication (MTC), and more particularly to a communication method for an ADN, and nodes.

BACKGROUND

A Machine-to-Machine/Man (M2M) communication system consists of M2M nodes and an underlying network. The M2M nodes communicate with one another through the underlying network. An M2M node may include an Application Entity (AE), or may include an AE and a Common Service Entity (CSE). The AE is a logical unit that executes an M2M application. The CSE is a logical unit that manages and serves the M2M application. An underlying Network Service Entity (NSE) provides services such as equipment management, location-based service, equipment triggering and the like for the CSE. For example, the NSE may be embodied as a Home Subscriber Server (HSS) and an MTC-Inter Working Function (MTC-IWF) entity.

Communication between M2M applications may be implemented by interaction between the CSEs. The M2M applications are required to be registered in the CSEs. The CSEs are also required to be mutually registered before the CSEs can conduct mutual communication in order to implement interaction between the M2M applications. The architecture of an M2M system is shown in FIG. 1.

In the architecture of an M2M system, an application node is an end execution node, for example, an intelligent electric meter, a temperature measurement and control sensor, a fire alarm and an intelligent home appliance. A Middle Node (MN) is middleware that connects an end execution node to a network-side server, and may be embodied as a gateway. An Infrastructure Node (IN) is a network-side server. An AE registered to an IN (also referred to as IN-AE), may be a management platform of an M2M Service Provider (M2M SP).

Application nodes may be divided into two categories according to different functions: nodes including CSEs and nodes including no CSEs. An ADN includes one AE, and does not include any CSE. An Application Service Node (ASN) includes one AE and one CSE.

During a practical application, when an application on a server is required to communicate with an application on an ASN, that is, when an IN-AE is required to communicate with an AE of the ASN (also referred to as ASN-AE), a CSE of the ASN (also referred to as ASN-CSE) needs to be triggered to establish a connection with a CSE of the IN (also referred to as IN-CSE). Since the IN is a network-side server, a triggering message may need to be sent through an underlying network.

However, ADNs are application nodes including no CSEs. For the problem on how to implement communication between an application on a server and an application on an ADN, i.e. how to implement communication between an IN-AE and an ADN-AE, there is yet no effective mechanism for triggering connection establishment in a related technology.

SUMMARY

Some embodiments of the present disclosure provide a communication method for an ADN, and nodes, which enable communication between an IN-AE and an ADN-AE.

The embodiments of the present disclosure adopt technical solutions which are implemented as follows.

A registration method for an ADN may include the following acts.

An MN-CSE creates an application dedicated resource for an ADN-AE, and the MN-CSE announces the application dedicated resource to an IN-CSE.

The IN-CSE creates an announcement resource corresponding to the application dedicated resource.

In an exemplary embodiment, the act that the MN-CSE creates the application dedicated resource for the ADN-AE may include the following act.

The MN-CSE creates the application dedicated resource for the ADN-AE according to a request.

In an exemplary embodiment, the act that the MN-CSE creates the application dedicated resource for the ADN-AE according to the request may include the following acts.

The MN-CSE receives a resource creation request from the ADN-AE, where the resource creation request includes a Uniform Resource Identifier (URI) or a CSE Identity (CSE-ID) of the IN-CSE.

The MN-CSE creates the application dedicated resource for the ADN-AE.

In an exemplary embodiment, the act that the IN-CSE creates the announcement resource corresponding to the application dedicated resource may include the following act.

The IN-CSE creates the announcement resource for the ADN-AE according to a request.

In an exemplary embodiment, the act that the IN-CSE creates the announcement resource for the ADN-AE according to the request may include the following acts.

The IN-CSE receives an announcement resource creation request from the MN-CSE, where the announcement resource creation request includes a URI of the application dedicated resource.

The IN-CSE creates the announcement resource corresponding to the application dedicated resource.

In order to solve the technical problem, an embodiment of the present disclosure also provides a communication method for an ADN, which may include the following acts.

An IN-CSE determines an application dedicated resource corresponding to an announcement resource according to an ADN-AE which an IN-AE requests to operate, and the IN-CSE establishes a connection with an MN-CSE.

The MN-CSE establishes a connection with the ADN-AE through the application dedicated resource.

In an exemplary embodiment, the act that the IN-CSE determines the application dedicated resource corresponding to the announcement resource may include the following acts.

The IN-CSE receives a resource acquisition request from the IN-AE, the resource acquisition request including an AE-ID of the ADN-AE.

The IN-CSE determines the announcement resource according to the AE-ID, and determines the application dedicated resource corresponding to the announcement resource according to a URI of the application dedicated resource in the announcement resource.

In an exemplary embodiment, before the IN-CSE establishes the connection with the MN-CSE, the method may further include the following act.

The IN-CSE announces a URI of the determined application dedicated resource to the IN-AE.

In order to solve the technical problem, an embodiment of the present disclosure also provides a first node, which may include a first establishment module and a first communication module.

The first establishment module may be arranged to create an application dedicated resource for an ADN-AE.

The first communication module may be arranged to announce the application dedicated resource to an IN-CSE.

In an exemplary embodiment, the first communication module may further be arranged to receive a resource creation request from the ADN-AE, where the resource creation request includes a URI or a CSE-ID of the IN-CSE.

In an exemplary embodiment, the first communication module may further be arranged to establish a connection with the ADN-AE through the application dedicated resource.

In order to solve the technical problem, an embodiment of the present disclosure also provides a second node, which may include a second communication module and a second establishment module.

The second communication module may be arranged to receive a URI of an application dedicated resource from an MN-CSE.

The second establishment module may be arranged to create an announcement resource corresponding to the application dedicated resource.

In an exemplary embodiment, the second communication module may be arranged to receive the URI of the application dedicated resource from the MN-CSE in the following manner of:

receiving an announcement resource creation request from the MN-CSE, where the announcement resource creation request includes the URI of the application dedicated resource.

In an exemplary embodiment, the second node may further include a query module, arranged to determine the application dedicated resource corresponding to the announcement resource according to an ADN-AE which an IN-AE requests to operate.

The second communication module may further be arranged to establish a connection with the MN-CSE.

In an exemplary embodiment, the second communication module may further be arranged to receive a resource acquisition request from the IN-AE, the resource acquisition request including an AE-ID of the ADN-AE.

The query module may further be arranged to determine the announcement resource according to the AE-ID, and determine the application dedicated resource corresponding to the announcement resource according to the URI of the application dedicated resource in the announcement resource.

In order to solve the technical problem, an embodiment of the present disclosure also provides a computer storage medium, in which a computer-executable instruction may be stored, the computer-executable instruction being arranged to execute the abovementioned method.

Compared with the related technology, the embodiments of the present disclosure have the following beneficial effects.

According to the embodiments of the present disclosure, the MN-CSE creates the application dedicated resource, and the IN-CSE creates the announcement resource corresponding to the application dedicated resource, associates the application dedicated resource with the announcement resource, and establishes the connection between the ADN-AE and the IN-AE to implement communication between the IN-AE and the ADN-AE.

DETAILED DESCRIPTION OF THE EMBODIMENTS

The embodiments of the present disclosure will be described below with reference to the drawings. It is important to note that the embodiments in the present disclosure and characteristics in the embodiments may be freely combined under the condition of no conflicts.

Figure 1:
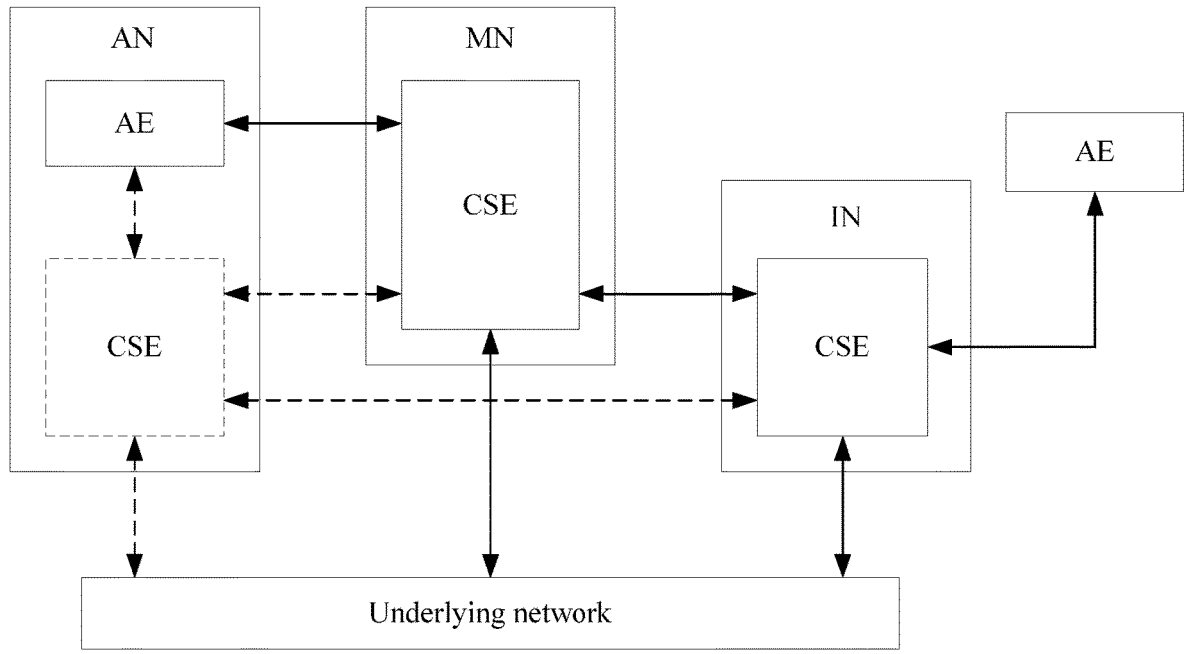
FIG. 1 is a diagram of the architecture of an M2M system.
Figure 2:
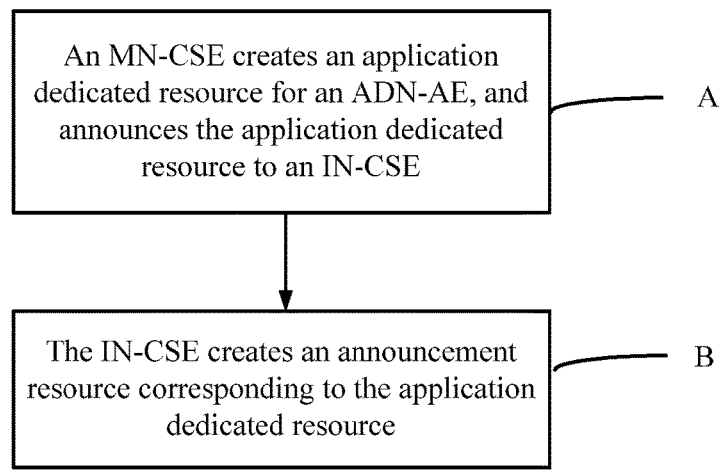
FIG. 2 is a flowchart of a registration method for an ADN according to an embodiment of the present disclosure.

As shown in FIG. 1 and FIG. 2, a registration method for an ADN may include the following acts A and B.

At act A, an MN-CSE creates an application dedicated resource for an ADN-AE, and announces the application dedicated resource to an IN-CSE.

At act B, the IN-CSE creates an announcement resource corresponding to the application dedicated resource.

In the embodiments of the present disclosure, the MN-CSE may announce the application dedicated resource to the ADN-AE, and the IN-CSE may announce the announcement resource to the MN-CSE.

In the embodiments of the present disclosure, the operation that the MN-CSE creates the application dedicated resource for the ADN-AE in act A may include the following acts.

The MN-CSE receives a resource creation request from the ADN-AE, where the resource creation request includes a URI or a CSE-ID of the IN-CSE.

The MN-CSE creates the application dedicated resource for the ADN-AE.

In the embodiments of the present disclosure, the operation that the IN-CSE creates the announcement resource corresponding to the application dedicated resource in act B may include the following acts.

The IN-CSE receives an announcement resource creation request from the MN-CSE, where the announcement resource creation request includes a URI of the application dedicated resource.

The IN-CSE creates the announcement resource corresponding to the application dedicated resource.

Figure 3:
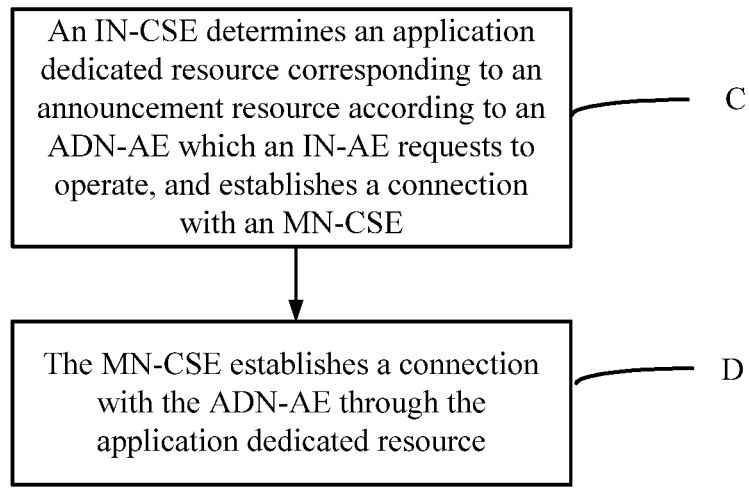
FIG. 3 is a flowchart of a communication method for an ADN according to an embodiment of the present disclosure.

As shown in FIG. 1 and FIG. 3, a communication method for an ADN may include the following acts C and D.

At act C, an IN-CSE determines an application dedicated resource corresponding to an announcement resource according to an ADN-AE which an IN-AE requests to operate, and the IN-CSE establishes a connection with an MN-CSE.

At act D, the MN-CSE establishes a connection with the ADN-AE through the application dedicated resource.

In the embodiments of the present disclosure, the operation that the IN-CSE determines the application dedicated resource corresponding to the announcement resource in act C may include the following acts.

The IN-CSE receives a resource acquisition request from the IN-AE, the resource acquisition request including an AE-ID of the ADN-AE.

The IN-CSE determines the announcement resource according to the AE-ID, and determines the application dedicated resource corresponding to the announcement resource according to a URI of the application dedicated resource in the announcement resource.

In the embodiments of the present disclosure, before the operation that the IN-CSE establishes the connection with the MN-CSE in act C, the method may further include the following act.

The IN-CSE announces a URI of the determined application dedicated resource to the IN-AE.

Figure 4:
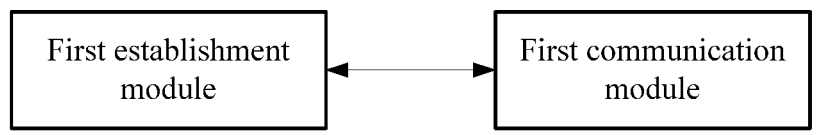
FIG. 4 is a block diagram of a first node according to an embodiment of the present disclosure.

A first node arranged on an MN-CSE side is provided in an embodiment, and as shown in FIG. 4, the first node may include a first establishment module and a first communication module.

The first establishment module may be arranged to create an application dedicated resource for an ADN-AE.

The first communication module may be arranged to announce the application dedicated resource to an IN-CSE.

The first communication module may be further arranged to receive a resource creation request from the ADN-AE, where the resource creation request includes a URI or a CSE-ID of the IN-CSE.

The first communication module may be further arranged to establish a connection with the ADN-AE through the application dedicated resource.

Figure 5:
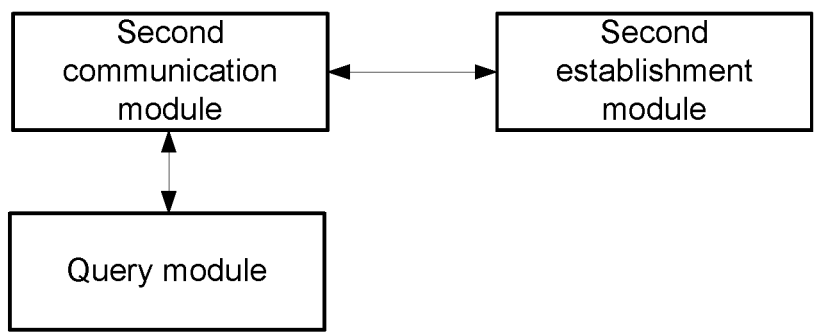
FIG. 5 is a block diagram of a second node according to an embodiment of the present disclosure.

A second node arranged on an IN-CSE side is provided in another embodiment, and as shown in FIG. 5, the second node may include a second communication module and a second establishment module.

The second communication module may be arranged to receive a URI of an application dedicated resource from an MN-CSE.

The second establishment module may be arranged to create an announcement resource corresponding to the application dedicated resource.

The second communication module may be arranged to receive the URI of the application dedicated resource from the MN-CSE in the following manner of:

receiving an announcement resource creation request from the MN-CSE, where the announcement resource creation request includes the URI of the application dedicated resource.

The second node may further include a query module, arranged to determine the application dedicated resource corresponding to the announcement resource according to an ADN-AE which an IN-AE requests to operate.

The second communication module may be further arranged to establish a connection with the MN-CSE.

The query module may be arranged to determine the application dedicated resource corresponding to the announcement resource in the following manner.

The second communication module may be further arranged to receive a resource acquisition request from the IN-AE, the resource acquisition request including an AE-ID of the ADN-AE.

The query module may be arranged to determine the announcement resource according to the AE-ID, and determine the application dedicated resource corresponding to the announcement resource according to the URI of the application dedicated resource in the announcement resource.

First Embodiment

Figure 6:
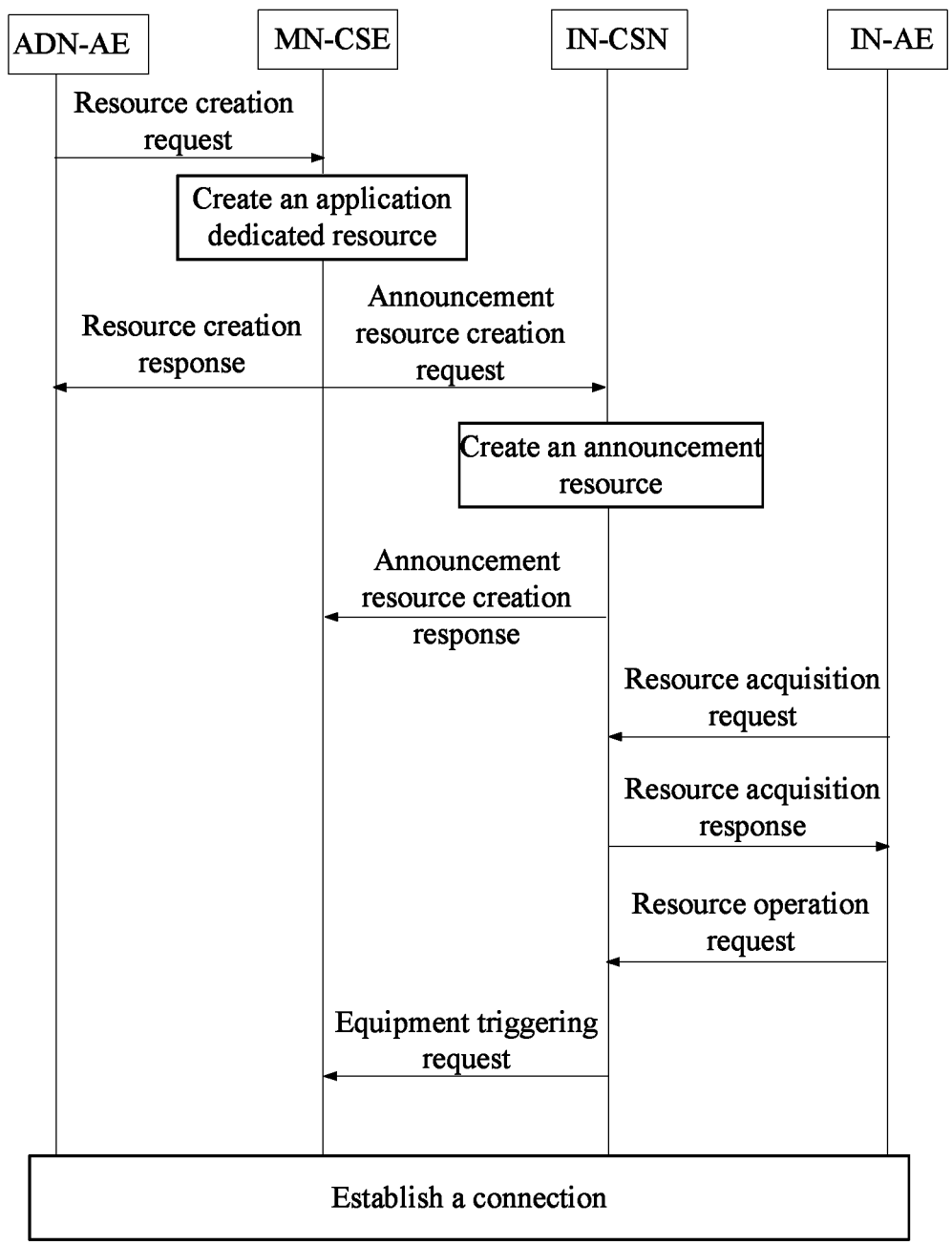
FIG. 6 is a flowchart of triggering of an ADN according to a first embodiment of the present disclosure.

As shown in FIG. 6, in order to enable the communication between an application on a server and an application on an ADN, the following acts 1 to 10 are executed in the embodiment.

At act 1, an ADN-AE sends a resource creation request to an MN-CSE, the resource creation request message including:

1) a resource type: application;
2) a content: including an attribute of a resource required to be created:
"announce to": a URI or an ID of an IN-CSE to which an AE of an M2M SP subscribed by the ADN is registered; and
3) an AE ID: an AE-ID of the ADN-AE.

At act 2, after authorizing and authenticating the ADN-AE, the MN-CSE creates a resource "AE1" of a type "AE", creates an "announce to" attribute for the resource "AE1", and sets an attribute value to be the same as a value of an "announce to" parameter in the request message.

On the other hand, the MN-CSE sends a resource creation response to the ADN-AE, a response message including a URI of the resource "AE1".

At act 3, the MN-CSE sends an announcement resource creation request to the IN-CSE indicated by the "announce to" attribute, a announcement resource creation request message including:

1) the URI of the original resource "AE1";
2) a search tag of the original resource "AE1";
3) a content: including an attribute of a resource required to be created:
"triggering message recipient ID", of which the value is an application port ID (Application-Port-ID) of the ADN-AE;
4) an AE ID, of which the value is an AE-ID of the ADN-AE; and
5) an application node ID, of which the value is an M2M external ID (M2M-Ext-ID) of the MN.

At act 4, after authorizing and authenticating the MN-CSE, the IN-CSE creates a resource "AE1Annc" of a type "announcement", creates "link", "tag", "triggering message recipient ID", "application node ID" and/or "AE ID" attributes/attribute for the resource "AE1Annc". According to the request message, the IN-CSE sets a value of the "link" attribute to be the URI of the original resource "AE1", sets a value of the "tag" attribute to be the search tag of the original resource "AE1", sets a value of the "triggering message recipient ID" attribute to be the application port ID of the ADN-AE, sets a value of the "AE ID" attribute to be an ID of the ADN-AE and sets a value of the "application node ID" attribute to be the M2M external ID of the MN.

On the other hand, the IN-CSE sends an announcement resource creation response to the MN-CSE, the announcement resource creation response message including a URI of the resource "AE1Annc".

At act 5, after receiving the announcement resource creation response sent by the IN-CSE, the MN-CSE updates the "announce to" attribute in the original resource "AE1" to set the attribute value to include a CSE-ID of the IN-CSE and the URI of the announcement resource "AE1Annc", creates an "announced attribute" attribute for the resource "AE1", and sets the attribute value to include the "triggering message recipient ID" attribute.

At act 6, when the IN-AE needs to communicate with the ADN-AE, a resource acquisition request is sent to the IN-CSE, the resource acquisition request message including:

1) a discovery address of a target attribute, of which the value is a URI of the IN-CSE; and 2) a content: including the target attribute required to be discovered:

"AE ID", of which the value is an AE-ID of the ADN-AE.

At act 7, after authenticating an IN-AE, the IN-CSE retrieves a target resource, i.e. the resource "AE1Annc" according to the request message, and feeds back the attribute value of the "link" attribute of the resource "AE1Annc", i.e. the URI of the original resource "AE1", to the IN-AE through a resource acquisition response.

At act 8, after receiving the resource acquisition response sent by the IN-CSE, the IN-AE sends a resource operation request to the IN-CSE, the resource operation request message including:

1) the URI of the target resource "AE1"; and
2) an operation, including an operation content required to be executed:

"create", indicating to execute a creation operation of the target resource; or

"acquire", indicating to execute an acquisition operation of the target resource; or "update", indicating to execute an updating operation of the target resource; or "delete", indicating to execute a deletion operation of the target resource; or "announce", indicating to execute an announcement operation of the target resource.

At act 9, after receiving the resource operation request sent by the IN-AE, the IN-CSE sends an equipment triggering request to the MN-CSE, the equipment triggering request message including:

1) the M2M-Ext-ID, i.e. the M2M external ID of the MN;
2) Trigger-Recipient-ID, i.e. the triggering message recipient ID of the ADN-AE; and
3) the CSE-ID, i.e. the ID of the IN-CSE.

At act 10, the MN-CSE establishes a connection with the IN-CSE through an NSE according to the request message, in this way, communication between the IN-AE and the ADN-AE may be implemented.

Although implementation modes of the present disclosure are disclosed above, their contents are only implementation modes adopted to facilitate understanding of the technical solutions of the present disclosure and not intended to limit the present disclosure. Those skilled in the art of the present disclosure may make any modification and variation to implementation forms and details without departing from the core technical solutions provided by the present disclosure. However, the scope of protection limited by the present disclosure shall be defined by the appended claims.

Those skilled in the art may understand that all or part of the acts of the abovementioned embodiments may be implemented by a flow of a computer program, the computer program may be stored in a computer-readable storage medium, the computer program is executed on a corresponding hardware platform (such as a system, equipment, a device and an apparatus), and during execution, one or combination of the acts of the method embodiment are included.

In an exemplary embodiment, all or part of the acts of the abovementioned embodiments may also be implemented by virtue of an integrated circuit, and these acts may form multiple integrated circuit modules, or multiple modules or acts therein may form a single integrated circuit module for implementation.

Each device/function module/function unit in the abovementioned embodiments may be implemented by adopting a universal computing device, and they may be concentrated on a single computing device, and may also be distributed on a network formed by multiple computing devices.

When being implemented in form of software function module and sold or used as an independent product, each device/function module/function unit in the abovementioned embodiments may be stored in a computer-readable storage medium. The abovementioned computer-readable storage medium may be a read-only memory, a magnetic disk, an optical disk or the like.

INDUSTRIAL APPLICABILITY

By the technical solutions, communication between an IN-AE and an ADN-AE may be implemented.

What is claimed is:

1. A registration method for an Application Dedicated Node (ADN), comprising:

creating, by a Common Service Entity of a Middle Node (MN-CSE), an application dedicated resource for an Application Entity of the ADN (ADN-AE), and announcing, by the MN-CSE, the application dedicated resource to a CSE of an Infrastructure Node (IN-CSE); and creating, by the IN-CSE, an announcement resource corresponding to the application dedicated resource;

receiving, by the IN-CSE, a resource acquisition request from an Application Entity registered to the IN (IN-AE), wherein the resource acquisition request comprises an AE-Identity (AE-ID) of the ADN-AE;

determining, by the IN-CSE, the application dedicated resource corresponding to the announcement resource according to the ADN-AE which the IN-AE requests to operate;

establishing, by the IN-CSE, a connection with the MN-CSE;

establishing, by the MN-CSE, a connection with the ADN-AE through the application dedicated resource;

wherein determining, by the IN-CSE, the application dedicated resource corresponding to the announcement resource according to the ADN-AE which the IN-AE requests to operate comprises: determining, by the IN-CSE, the announcement resource according to the AE-ID; and determining, by the IN-CSE, the application dedicated resource corresponding to the announcement resource according to a Uniform Resource Identifier (URI) of the application dedicated resource in the announcement resource.

2. The method as claimed in claim 1, wherein creating, by the MN-CSE, the application dedicated resource for the ADN-AE comprises:

creating, by the MN-CSE, the application dedicated resource for the ADN-AE according to a request.

3. The method as claimed in claim 2, wherein creating, by the MN-CSE, the application dedicated resource for the ADN-AE according to the request comprises:

receiving, by the MN-CSE, a resource creation request from the ADN-AE, wherein the resource creation request comprises a Uniform Resource Identifier (URI) or a CSE Identity (CSE-ID) of the IN-CSE; and creating, by the MN-CSE, the application dedicated resource for the ADN-AE.

4. The method as claimed in claim 1, wherein creating, by the IN-CSE, the announcement resource corresponding to the application dedicated resource comprises:

creating, by the IN-CSE, the announcement resource for the ADN-AE according to a request.

5. The method as claimed in claim 4, wherein creating, by the IN-CSE, the announcement resource for the ADN-AE according to the request comprises:
receiving, by the IN-CSE, an announcement resource creation request from the MN-CSE, wherein the announcement resource creation request comprises a Uniform Resource Identifier (URI) of the application dedicated resource; and
creating, by the IN-CSE, the announcement resource corresponding to the application dedicated resource.

6. A Machine-to-Machine/Machine-to-Man (M2M) communication system, comprising: a first node and a second node, wherein
the first node, comprising a hardware processor arranged to execute program modules comprising:
a first establishment module, arranged to create an application dedicated resource for an Application Entity of an Application Dedicated Node (ADN-AE); and
a first communication module, arranged to announce the application dedicated resource to a Common Service Entity of an Infrastructure Node (IN-CSE);
the second node, comprising a hardware processor arranged to execute program modules comprising:
a second communication module, arranged to receive a Uniform Resource Identifier (URI) of an application dedicated resource from a Common Service Entity of a Middle Node (MN-CSE); and
a second establishment module, arranged to create an announcement resource corresponding to the application dedicated resource;
a query module, arranged to determine the application dedicated resource corresponding to the announcement resource according to the ADN-AE which an AE registered to an Infrastructure Node (IN-AE) requests to be operated;
wherein the second communication module may be further arranged to establish a connection with the MN-CSE.

7. The system as claimed in claim 6, wherein
the first communication module may be further arranged to receive a resource creation request from the ADN-AE, wherein the resource creation request comprises a Uniform Resource Identifier (URI) or a CSE Identity (CSE-ID) of the IN-CSE.

8. The system as claimed in claim 6, wherein
the first communication module may be further arranged to establish a connection with the ADN-AE through the application dedicated resource.

9. The system as claimed in claim 6, wherein the second communication module is arranged to receive the URI of the application dedicated resource from the MN-CSE in the following manner of:
receiving an announcement resource creation request from the MN-CSE, wherein the announcement resource creation request comprises the URI of the application dedicated resource.

10. The system as claimed in claim 6, wherein
the second communication module may be further arranged to receive a resource acquisition request from the IN-AE, wherein the resource acquisition request comprises an AE-Identity (AE-ID) of the ADN-AE; and
the query module may be further arranged to determine the announcement resource according to the AE-ID, and determine the application dedicated resource corresponding to the announcement resource according to the URI of the application dedicated resource in the announcement resource.

11. A non-transitory computer storage medium, in which a computer-executable instruction is stored, and a process being arranged to execute the following computer-executable instruction steps:
creating an application dedicated resource for an Application Entity of the ADN (ADN-AE), and announcing, by the MN-CSE, the application dedicated resource to a CSE of an Infrastructure Node (IN-CSE); and
creating an announcement resource corresponding to the application dedicated resource;
receiving a resource acquisition request from an Application Entity registered to the IN (IN-AE), wherein the resource acquisition request comprises an AE-Identity (AE-ID) of the ADN-AE;
determining the application dedicated resource corresponding to the announcement resource according to the ADN-AE which the IN-AE requests to operate;
establishing a connection with the MN-CSE;
establishing a connection with the ADN-AE through the application dedicated resource;
wherein determining the application dedicated resource corresponding to the announcement resource according to the ADN-AE which the IN-AE requests to operate comprises: determining the announcement resource according to the AE-ID; and determining the application dedicated resource corresponding to the announcement resource according to a Uniform Resource Identifier (URI) of the application dedicated resource in the announcement resource.

* * * * *